(12) United States Patent
Nojima

(10) Patent No.: US 8,035,715 B2
(45) Date of Patent: Oct. 11, 2011

(54) IMAGE SENSOR

(75) Inventor: Koji Nojima, Chiba (JP)

(73) Assignee: Seiko Instruments Inc., Chiba (JP)

( * ) Notice: Subject to any disclaimer, the term of this patent is extended or adjusted under 35 U.S.C. 154(b) by 446 days.

(21) Appl. No.: 12/392,471

(22) Filed: Feb. 25, 2009

(65) Prior Publication Data

US 2009/0213257 A1    Aug. 27, 2009

(30) Foreign Application Priority Data

Feb. 26, 2008  (JP) ................. 2008-044394

(51) Int. Cl.
  *H04N 5/335*   (2006.01)
  *H01L 27/00*   (2006.01)
(52) U.S. Cl. ............... 348/302; 348/294; 250/208.1
(58) Field of Classification Search ........... 250/208.1;
  348/294, 302, 308, E5.085, E5.091
  See application file for complete search history.

(56) References Cited

U.S. PATENT DOCUMENTS 5,369,618 A * 11/1994 Takasugi ............... 365/230.01
5,838,622 A * 11/1998 Liu et al. ............... 365/230.02

FOREIGN PATENT DOCUMENTS

JP          2003-87660 A      3/2003
* cited by examiner

*Primary Examiner* — David N Spector
(74) *Attorney, Agent, or Firm* — Brinks Hofer Gilson & Lione

(57) ABSTRACT

Provided is an image sensor that may reduce the number of external terminals for downsizing of a chip, generate a write signal (RE) of a Y address with one pulse, and employ an external circuit having the same configuration as that of the conventional example. The image sensor uses an X-Y address scanning system in a pixel element matrix, and includes: a register latch that sets a Y address for selection of a row according to a write signal; a Y address register that decodes a Y address data from the register latch to output a Y address signal for selection of the row in the pixel element matrix; and an X address control unit that generates an X address signal for selection of a column. The register latch brings the Y address register into a disenable state so as to cause the Y address register not to output the Y address signal at timing at which the write signal is input to the Y address register, and brings the Y address register into an enable state so as to cause the Y address register to output the Y address signal at timing at which the input of the write signal is completed and the Y address data is written into the Y address register.

5 Claims, 6 Drawing Sheets

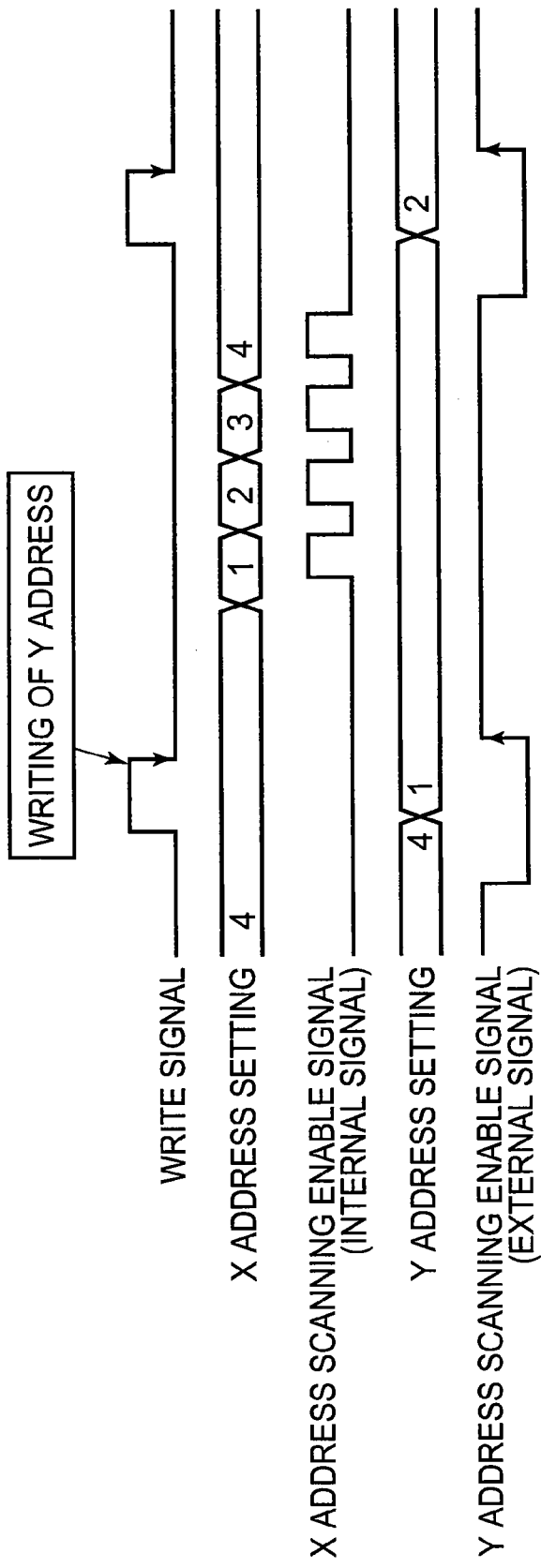

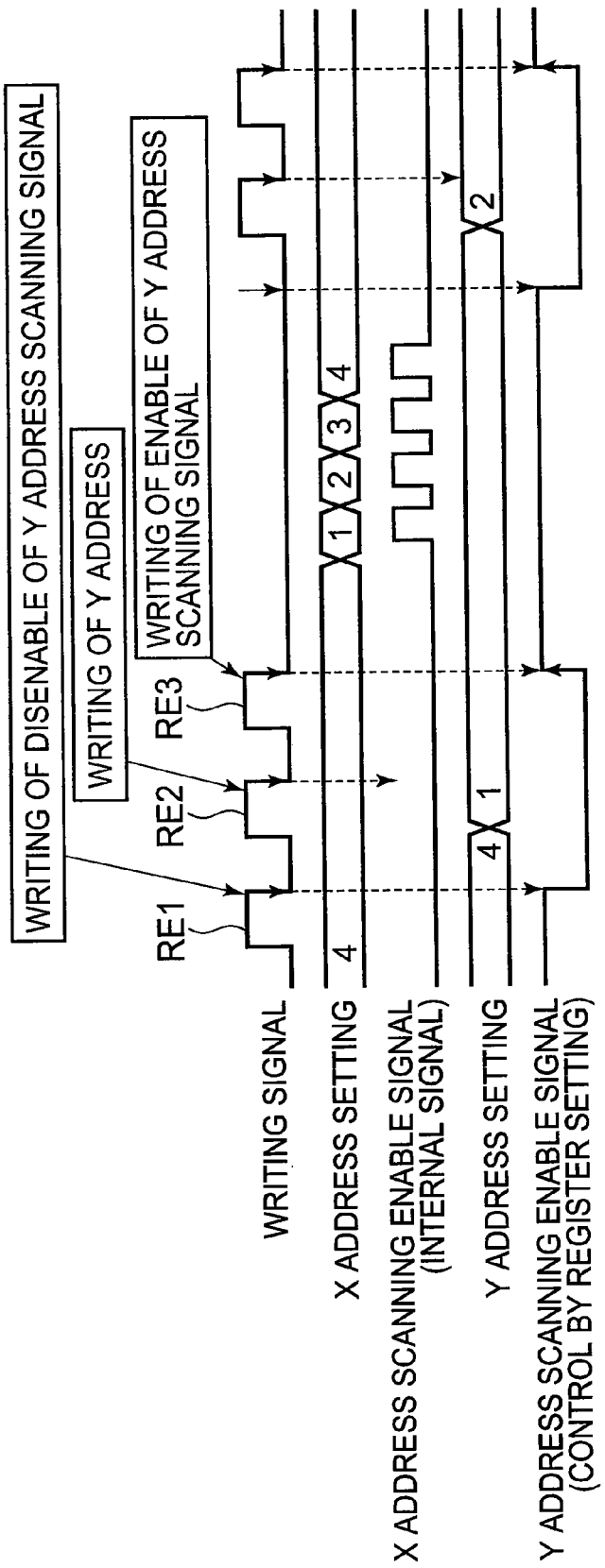

IMAGE SENSOR

RELATED APPLICATIONS

This application claims priority under 35 U.S.C. §119 to Japanese Patent Application No. JP2008-044394 filed on Feb. 26, 2008, the entire content of which is hereby incorporated by reference.

BACKGROUND OF THE INVENTION

1. Field of the Invention

The present invention relates to an image sensor for outputting pixel data imaged by an X-Y address scanning system in chronological order from each of pixel elements arranged in matrix.

2. Description of the Related Art

As a system in which pixel data is sequentially read from each of pixel elements in an image sensor, there has been generally employed an X-Y address scanning system in which positions in an X-direction and a Y-direction are sequentially designated on a pixel element basis by address scanning circuits for the X-direction and the Y-direction to read the pixel data from each of the pixel elements in chronological order (for example, refer to JP 2003-87660 A).

As a basic operation, while a Y address is set, an X address is sequentially incremented. When image data of all the X addresses for the set Y address has been read, the Y address is incremented to sequentially read the image data from the pixel elements.

However, in the conventional image sensor disclosed in JP 2003-87660 A and so on, the X address is incremented when a clock is input, where the Y address is read from is set, and therefore it is necessary to set the Y address according to a write signal. When the Y address is set, it is necessary to enable writing into the Y address and to disenable the writing into the Y address upon completion of the writing.

Conventional examples of the image sensor using the X-Y address scanning system include a circuit configuration illustrated in FIG. 4. FIG. 5 is a timing chart illustrating an operation of an image sensor of FIG. 4.

When the write signal RE is input to the image sensor during a disenable period (period of "L" level) where no Y address scanning enable signal is input to the image sensor from an external terminal, a Y address is written into a register latch 100 from a data bus. Then, Y address signals YA1 to YA4 resulting from decoding the Y addresses are set in a Y address register 101 according to the write signal RE, but none of those signals are output at this time.

Then, the Y address register 101 outputs, to a pixel element matrix 103, any one of the Y address signals YA1 to YA4, that is, a Y address signal corresponding to the Y address at, for example, "H" level during an enable period (period of "H" level) where the Y address scanning enable signal is input. The Y address does not change even if the write signal RE is input to the image sensor during the period during which the Y address scanning enable signal is input thereto.

The Y address scanning enable signal is input to the image sensor, and an X address control unit 102 increments the X address, and outputs, to the pixel element matrix 103, any one of X address signals XA1 to XA4, that is, an X address signal corresponding to the X address at, for example, "H" level at timing at which the X address scanning enable signal synchronous with an internal clock is sequentially input thereto.

Then, pixel data is read from a pixel element selected from an X pixel element matrix according to the Y address signal and the X address signal.

However, in the case of the image sensor illustrated in FIG. 4, the external terminal for inputting the Y address scanning enable signal is required, and provision of the external terminal inhibits a reduction in the size of an image sensor chip.

On the other hand, another conventional example of the image sensor using the X-Y address scanning system is a circuit configuration illustrated in FIG. 6. FIG. 7 is a timing chart illustrating an operation of an image sensor of FIG. 6. A circuit of FIG. 6 is configured to generate the Y address scanning enable signal with the aid of an internal circuit according to the write signal RE, without provision of the external terminal for inputting the Y address scanning enable signal. A register latch 200 brings the Y address scanning enable signal that is output to a Y address register 201 into a disenable state at a falling edge of a first write signal RE1.

As a result, the Y address register 201 does not output any one of Y address signals YA1 to YA4 obtained by decoding the Y addresses input from the register latch 200.

Subsequently, the register latch 200 holds the Y address input from the data bus in response to a falling edge of a second write signal RE2, and outputs the held Y address to the Y address register 201.

Then, the register latch 200 brings the Y address scanning enable signal into an enable state at a falling edge of a third write signal RE3.

As a result, the Y address register 201 decodes the Y address input from the register latch 200, and resultantly outputs any one of the Y address signals YA1 to YA4, and selects any one of rows of the pixel elements in a pixel element matrix 203. Further, an X address control unit 202 selects any one of columns of the pixel elements in the pixel element matrix 203 as in the circuit of FIG. 4. As a result, any one of the pixel elements in the pixel element matrix 203 is selected to read pixel data therefrom.

However, in the case of the image sensor illustrated in FIG. 6, no external terminal for inputting the Y address scanning enable signal is required, but it is necessary to generate the write signals RE by three pulses (a plurality of pulses) with respect to one writing of Y address. As a result, the image sensor suffers from a defect that an external circuit for generating the write signal RE is complicated in configuration, and the circuit scale becomes larger.

SUMMARY OF THE INVENTION

In view of the above drawbacks of the prior art, the present invention provides an image sensor which can reduce the number of external terminals, thereby reducing the size of the chip, and require only one pulse of write signal RE to write the Y address data from the outside, whereby it may have an external circuit similar to that shown in FIG. 4.

The image sensor according to the present invention comprises a matrix of pixel elements for storing pixel data each addressable by an X-Y address scanning system. The image sensor comprises a register latch which is responsive to a pulse of write signal to turn off a Y address scanning enable signal no earlier than a leading edge of the write signal pulse and turn on the Y address scanning enable signal no earlier than a trailing edge of the write signal pulse. Also, the resister latch, responsive to the pulse of write signal, reads and holds Y address data substantially simultaneously with the leading edge of the write signal pulse.

The image sensor according to the present invention further comprises a Y address register which disables itself from addressing the pixel elements while the Y address scanning enable signal from the register latch is turned off and decodes the Y address data held by the register latch.

The resister latch may turn off the Y address scanning enable signal substantially simultaneously with the leading edge of the write signal pulse, whereas turning on the Y address scanning enable signal subsequently to the training edge of the write signal pulse.

The Y address register selects a row of pixel elements, using the decoded Y address data, when the Y address scanning enable signal is turned on.

The image sensor according to the present invention may further comprises an X address control unit which increments an X address signal to sequentially select the columns of pixel elements.

The image sensor according to the present invention may further comprises switches each functioning to gate outputs of a column of pixel elements, and the X address signal from the X address control unit, while being incremented, selectively activates the switches to sequentially enable outputs from the columns of pixel elements.

As has been described above, according to the present invention, the enable and disenable states of the Y address register are controlled according to the write signal of one pulse which is input from the outside. Therefore, there may be obtained such advantages that no external terminal is required, and the configuration of the external circuit for generating the write signal is simplified.

BRIEF DESCRIPTION OF THE DRAWINGS

In the accompanying drawings:

FIG. 5 is a timing chart for describing an operation of the image sensor of FIG. 4;

FIG. 7 is a timing chart for describing an operation of the image sensor of FIG. 5.

DETAILED DESCRIPTION OF THE PREFERRED EMBODIMENTS

Figure 1:
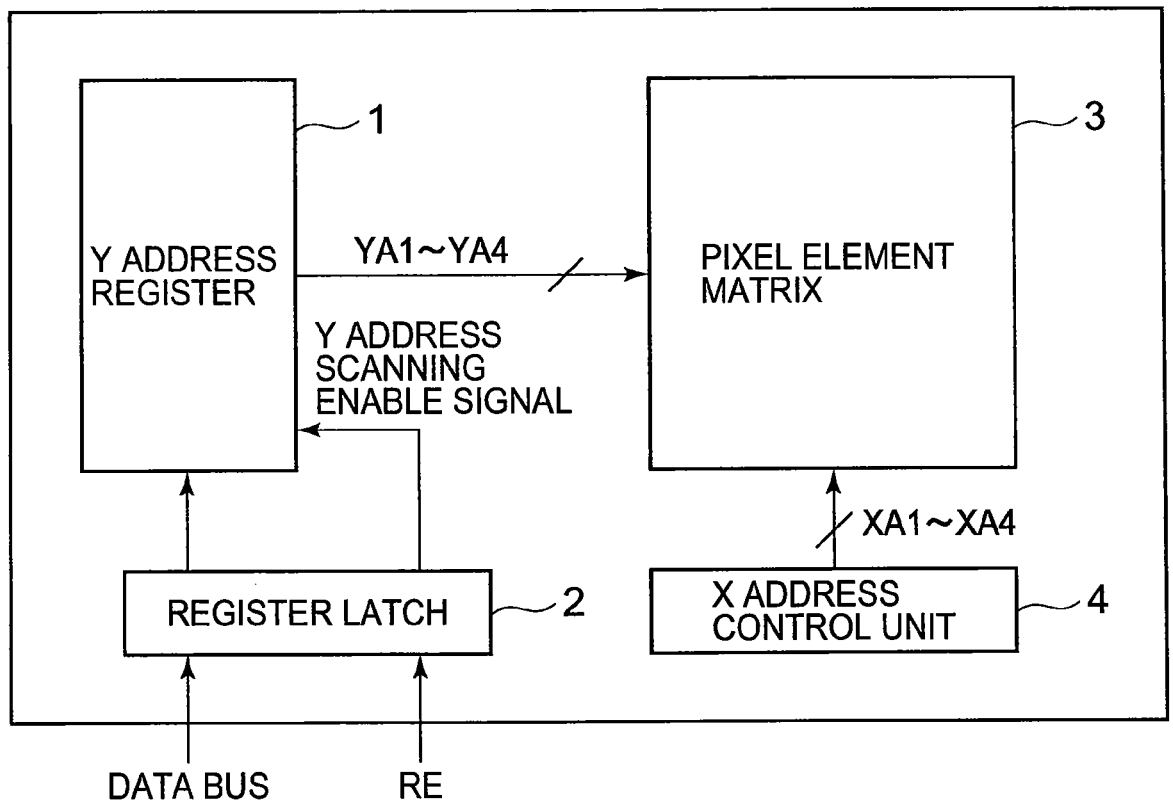
FIG. 1 is a block diagram illustrating a configuration example of an image sensor according to an embodiment of the present invention.

Hereinafter, a description is given of an image sensor according to an embodiment of the present invention with reference to the accompanying drawings. FIG. 1 is a block diagram illustrating a configuration example of an image sensor according to the embodiment of the present invention;

In FIG. 1, the image sensor according to this embodiment includes a Y address register 1, a register latch 2, a pixel element matrix 3, and an X address control unit 4.

when receiving a write signal, upon the rising edge, for instance, thereof, where the write signal is a "H" level pulse (in this embodiment, the write signal RE is a "H" level pulse input), the register latch 2 is put into a state in which it stops outputting a Y address scanning enable signal to the Y address register 1 (in this embodiment, the Y address scanning enable signal enables address scanning by the address register 1 when it is at "H" level).

Further, when receiving the write signal RE, in addition to bringing the Y address scanning enable signal into "L" level, the register latch 2 receives and holds the Y address data from the data bus to output the Y address data to the Y address register 1 when it detects that the data from an external circuit through the data bus is the Y address data, and a received control signal is an instruction to write the Y address data. The register latch 2 may be configured such that, when the data input to the register latch 2 from the data bus is the Y address data, and the control signal is an instruction to write the Y address data, it delays the timing at which the Y address scanning enable signal is put back into "H" level from the timing at which the input of the write signal RE ends, that is, at the falling edge of the write signal RE. In this example, the register latch 2 analyzes the control signal input together with the data (compares the input control signal with a control signal set value indicative of a predetermined control type, to thereby detect what is to be controlled), thereby detecting the type of operation such as writing of the Y address or control of another operation.

Further, when the control signal of data input from the data bus is not a signal indicative of writing of the Y address data, the register latch 2 keeps the Y address scanning enable signal in the "L" level, and maintains the disenable state. Then, the register latch 2 receives the write signal, and detects that the data from the data bus at that time is the control signal indicative of writing of the Y address data. Then, the register latch 2 brings the Y address scanning enable signal into "H" level at the falling edge of a pulse of the write signal RE, and transits the signal to an enable state. That is, the register latch 2 transits the Y address scanning enable signal from the disenable state to the enable state only when detecting the control signal indicative of writing of the Y address data. Further, in the case where the Y address scanning enable signal is in the enable state, even if the data is not the control signal indicative of writing of the Y address data but a control signal indicative of control of another operation, the register latch 2 transits the Y address scanning enable signal from the enable state to the disenable state upon detection of the transition of "H" level of the write signal RE.

The Y address register 1 decodes the Y address data input from the register latch 2, and generates the Y address signals YA1 to YA4 corresponding to the Y address data.

Further, when the Y address scanning enable signal at "H" level is input to the Y address register 1 from the register latch 2, the Y address register 1 outputs any one of the Y address signals YA1 to YA4 at "H" level. On the other hand, when the Y address scanning enable signal from the register latch 2 is at "L" level, the Y address register 1 outputs all of the Y address signals YA1 to YA4 at "L" level.

The X address control unit 4 is internally provided with a counter, and increments and generates the X address according to a clock input from the outside after the Y address scanning enable signal has been put into "H" level (after a delay time as long as the state becomes stable). Then, the X address control unit 4 decodes the X address, and ANDs the decoded X address and the X address enable signal synchronous with the clock input from the outside, thereby generating and outputting the X address signals XA1 to XA4 (outputting any one of the X address signals XA1 to XA4 at "H" level).

The X address control unit 4 generates the X address scanning enable signal at timing not including a change point of the counted X address setting.

Further, when the Y address scanning enable signal is at "L" level, a pixel element at a cross point of a row selected by the Y address signal output from the Y address register 1, and a column selected by the X address signal output from the X address control unit 4, is selected in the pixel element matrix 3, to read image data therefrom.

Figure 2:
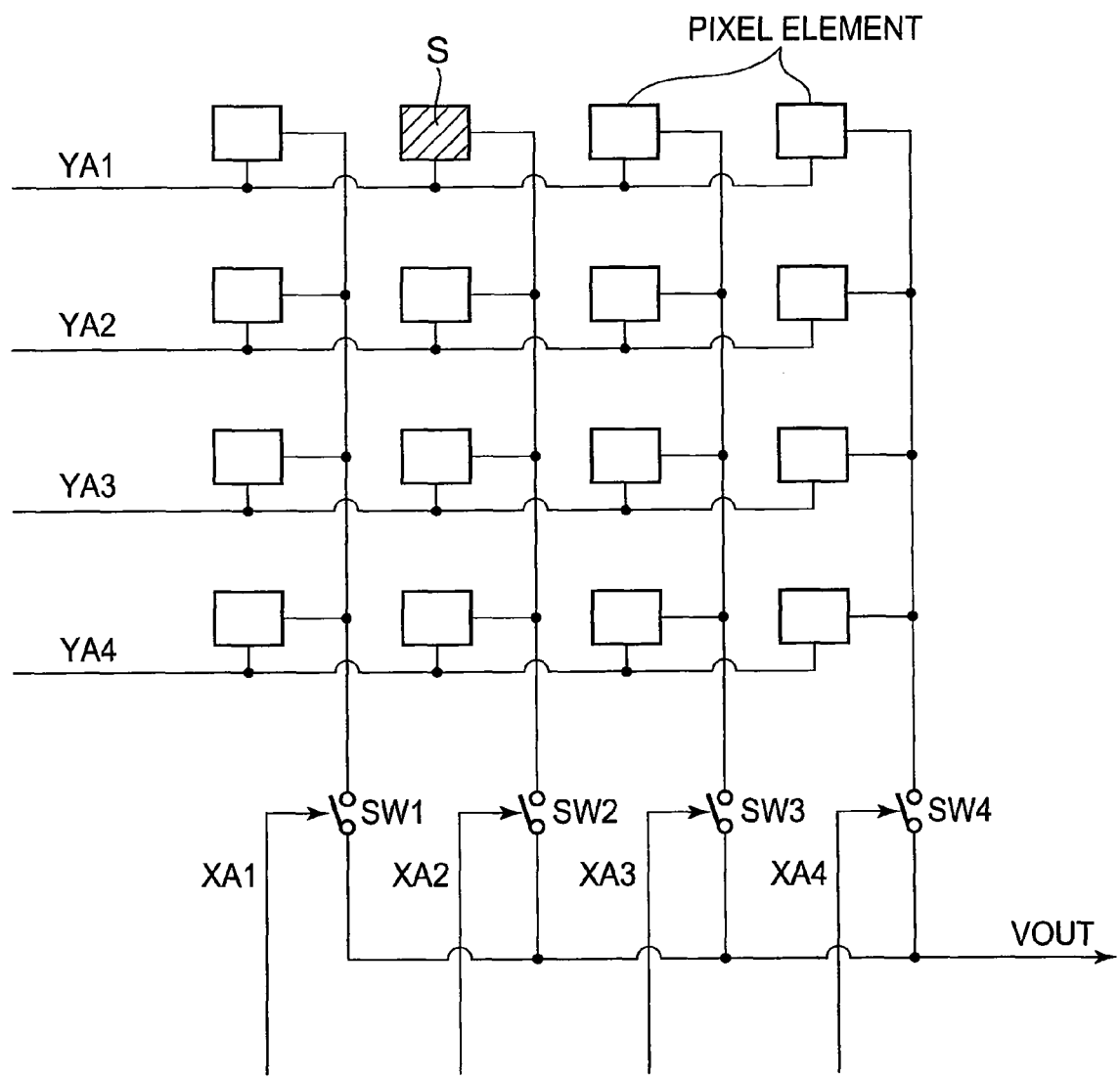
FIG. 2 is a conceptual diagram illustrating a configuration of a pixel element matrix of FIG. 1 (FIGS. 4 and 6)

FIG. 2 is a block diagram illustrating a configuration example of the pixel element matrix 3. When the Y address scanning enable signal is "H" level, any one of the Y address signals YA1 to YA4 becomes "H" level, and a column of the pixel element to which the address signal of "H" level is input is selected to output the pixel data from all thereof.

Then, output terminals of the pixel elements are connected to a switch for each column of the pixel elements. As illustrated in FIG. 2, a first column (column of pixel elements at left end of FIG. 2) is connected to one terminal of a switch SW1, a second column is connected to one terminal of a switch SW2, a third column is connected to one terminal of a switch SW3, and a fourth column is connected to one terminal of a switch SW4.

Other terminals of the respective switches SW1, SW2, SW3, and SW4 are commonly connected to an output terminal VOUT that connects the pixel data in chronological order. Further, when the X address signal is input to the switches SW1, SW2, SW3, and SW4, the X address signal becomes "H" level in this embodiment, and then any one of the corresponding switches (SW1, SW2, SW3, and SW4) becomes an on-state (conductive state), and outputs the pixel data output from the pixel element to the output terminal VOUT.

For example, when the Y address register 1 outputs the Y address signal YA1 at "H" level, and the Y address signals YA2 to YA4 at "L" level, a row of the pixel elements on a first row (uppermost portion in FIG. 2) is selected to output the pixel data from all of the pixel elements. Then, when the X address control unit brings the X address signal XA2 to "H" level and the X address signals XA1, XA3, and XA4 to "L" level, the switch SW2 becomes the on-state, and the pixel data output from the pixel element S is output to the output terminal VOUT.

Figure 3:
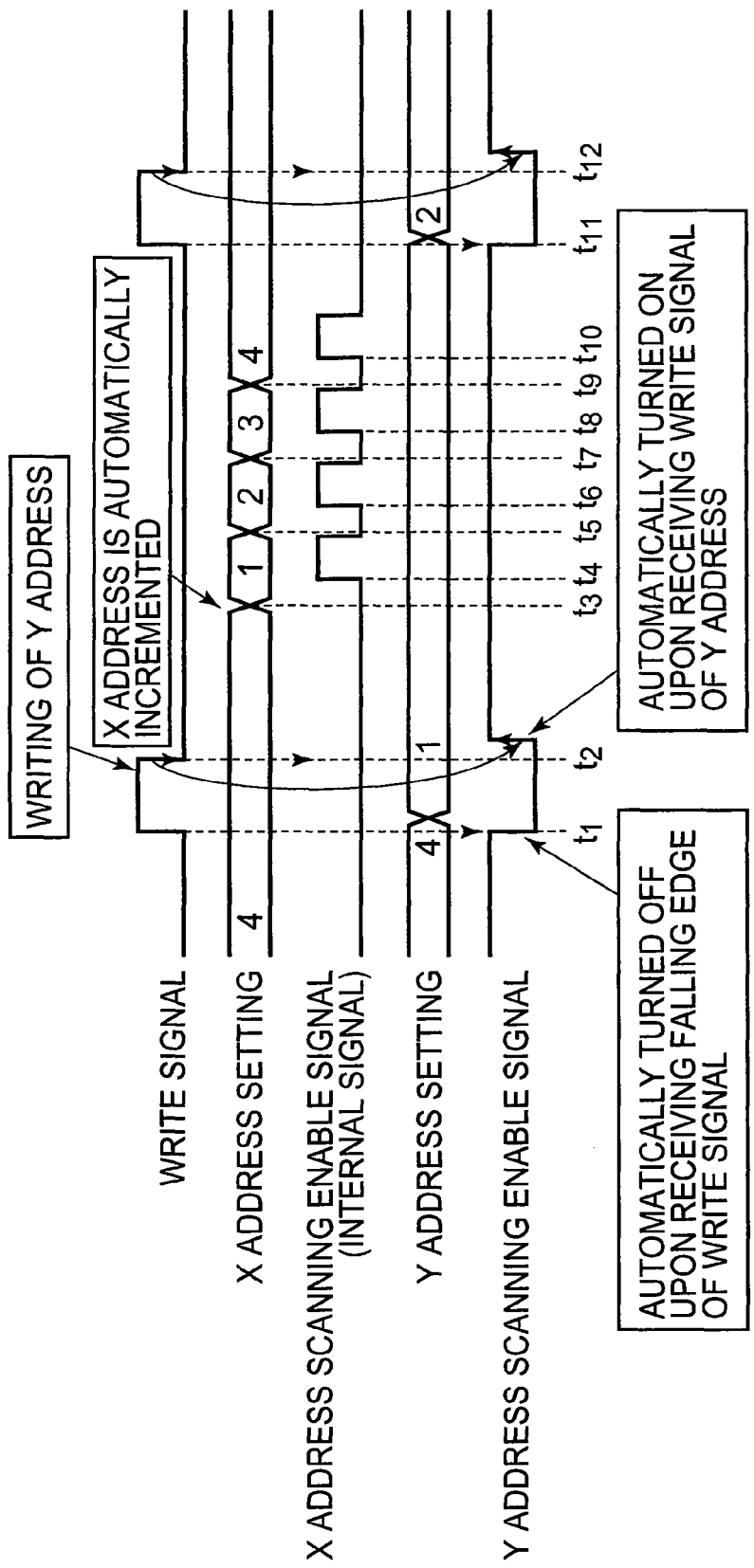
FIG. 3 is a timing chart for describing an operation of the image sensor of FIG. 1.
Figure 4:
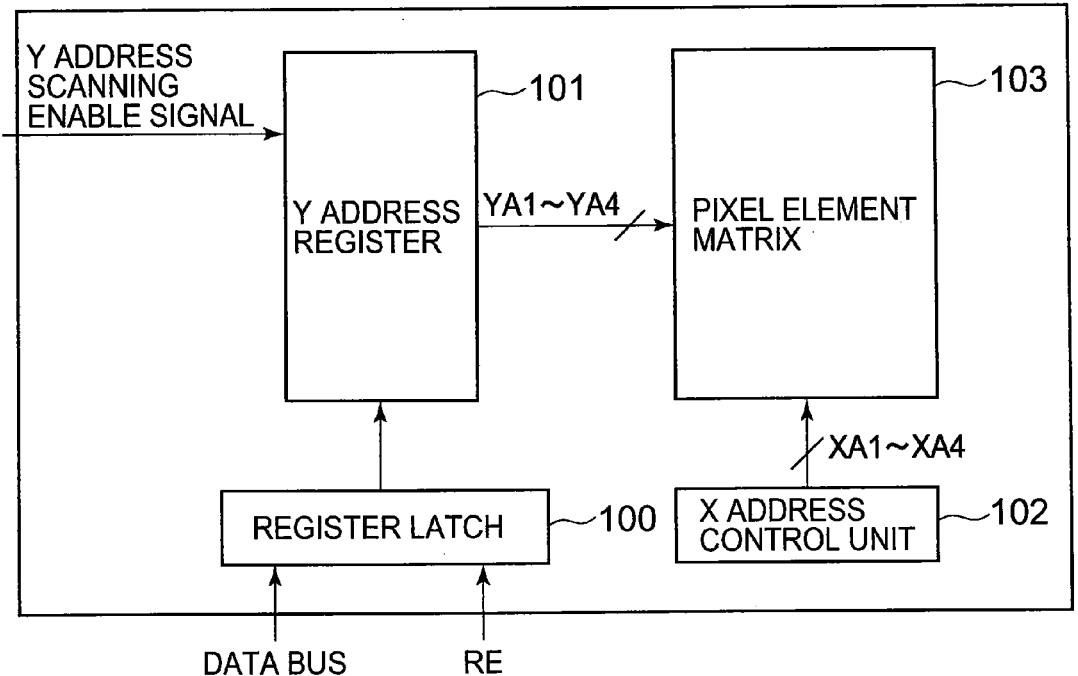
FIG. 4 is a block diagram illustrating a configuration example of a conventional image sensor.
Figure 6:
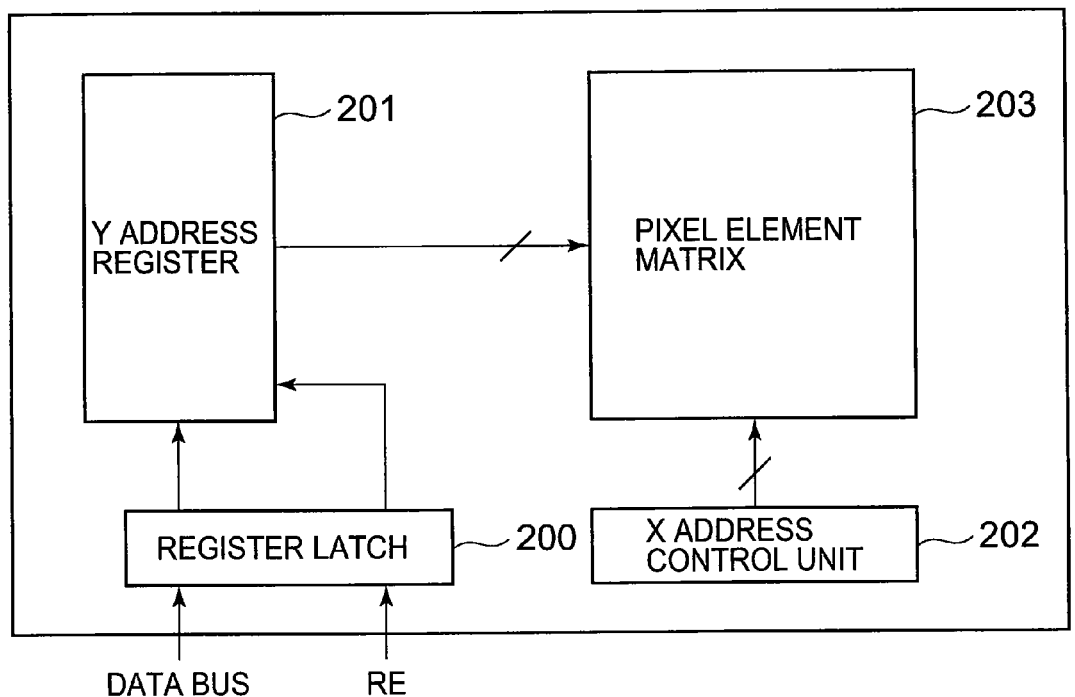
FIG. 6 is a block diagram illustrating another configuration example of the conventional image sensor.

Next, a description is given of the operation of the image sensor according to this embodiment with reference to FIGS. 1, 2, and 3. FIG. 3 is a timing chart for describing the operation example of the image sensor of FIG. 1.

At a time t1, Y address data is input from the external circuit through the data bus, and the write signal RE for writing the Y address data into the register latch 2 is input with a pulse of "H" level.

As a result, the register latch 2 brings the Y address scanning enable signal to the Y address register 1 into "L" level at a rising edge of the pulse.

Then, when the register latch 2 detects that the control signal input together with the data from the data bus is a signal indicative of writing of the Y address data, the respective circuits of the image sensor start operation described below.

When the Y address scanning enable signal becomes "L" level, the Y address register 1 outputs all of the Y address signals YA1 to YA4 at "L" level, and brings all of the pixel elements into the off-state, because the Y address scanning enable signal is at "L" level. Further, the X address control unit 4 outputs all of the X address signals XA1 to XA4 at "L" level, and brings all of the switches SW1 to SW4 into the off-state, because the Y address scanning enable signal is at "L" level.

Subsequently, at the rising edge of the pulse of the write signal RE, the register latch 2 reads the Y address data from the data bus and outputs the Y address data to the Y address register 1.

As a result, the Y address register 1 decodes the input Y address data, and generates the Y address signals YA1 to YA4. However, the Y address scanning enable signal is at "L" level, and hence the Y address register 1 does not output the generated Y address signals YA1 to YA4.

Then, at timing t2 when the write signal RE drops, the register latch 2 brings the Y address scanning enable signal into "H" level. When the Y address scanning enable signal becomes "H" level, the Y address register 1 outputs the decoded Y address signals YA1 to YA4, in the case of FIG. 3, outputs the Y address signal YA1 at "H" level, and the Y address signals YA2 to YA4 at "L" level.

As a result, in the pixel element matrix 3, pixels on the first row of the uppermost portion are selected, and all of the pixels on the selected row output pixel data.

Subsequently, at a time t3, the X address control unit 4 sets an internal counter to "1" upon inputting one pulse of the internal clock. In this example, a period of time since t2 at which the Y address data is written into the register latch 2 till t3 at which the internal counter starts its increment in response to the clock input from the external is a predetermined period of time. In this example, the internal counter is a quaternary counter, that is, the internal counter counts "1" to "4", and when a clock is input to the internal counter after "4" has been counted, is reset to "1".

Then, at a time t4, the X address control unit 4 decodes the X address data output from the counter, and outputs the X address signals XA1 to XA4 in synchronization with the internal clock. In this case, the X address data is "1", and hence the X address control unit 4 outputs the X address signal XA1 as "H" level, and the X address signals XA2 to XA4 as "L" level.

As a result, in the pixel element matrix 3, the Y address signal YA1 is at "H" level, and hence all of the pixels on the first row of the uppermost portion of the pixel elements are activated to output the pixel data. On the other hand, all of the Y address signals YA2 to YA4 are at "L" level, and hence none of other pixel elements on second to fourth rows are activated to output no pixel data. Further, the X address signal XA1 is at "H" level, and hence the switch SW1 becomes the on-state, and pixel data of the pixel element on a first column (left end column) of the a first row is output to the output terminal VOUT.

Subsequently, at a time t5, the X address control unit 4 increments the counter, and the X address data becomes "2".

Then, at a time t6, the X address control unit 4 outputs, in synchronization with the internal clock, the X address signal XA2 as "H" level, and the X address signal XA1, the X address data XA3, and the X address data XA4 as "L" level.

As a result, the X address signal XA2 is at "H" level, and hence the switch SW2 becomes the on-state, and pixel data of the pixel element on a second column of the first row is output to the output terminal VOUT.

Then, like the above-mentioned operations at the times t3 to t6, pixel data of the pixel element on a third column of the first row is output to the output terminal VOUT at times t7 and t8. Pixel data of the pixel element on a fourth column of the first row is output to the output terminal VOUT at times t9 and t10.

Subsequently, at a time t11, the control signal input together with data from the external circuit through the data bus is a signal indicative of writing of the Y address data, and Y address data for selecting the column of the pixel element on a second row is input. Here, like the time t1, the write signal RE for writing the Y address data into the register latch 2 is input with a pulse of "H" level.

As a result, the register latch 2 brings the Y address scanning enable signal to the Y address register 1 into "L" level.

When the Y address scanning enable signal becomes "L" level, the Y address register 1 outputs all of the Y address signals YA1 to YA4 at "L" level, and brings all of the pixel elements into the off-state, because the Y address scanning enable signal is at "L" level.

Further, the X address control unit 4 outputs all of the X address signals XA1 to XA4 at "L" level, and brings all of the switches SW1 to SW4 into the off-state, because the Y address scanning enable signal is at "L" level.

Subsequently, at a time t12, the register latch 2 reads and holds the Y address data from the data bus at a falling edge of the pulse of the write signal RE, and outputs the held Y address data to the Y address register 1.

As a result, the Y address register 1 decodes the input Y address data, and generates the Y address signals YA1 to YA4. However, the Y address scanning enable signal is at "L" level, and hence the Y address register 1 does not output the generated Y address signals YA1 to YA4.

Then, the register latch 2 outputs the Y address scanning enable signal as "H" level after having written the Y address data.

When the Y address scanning enable signal becomes "H" level, the Y address register 1 outputs the decoded Y address signals YA1 to YA4, in the case of FIG. 3, outputs the Y address signal YA2 at "H" level, and the Y address signals YA1, YA3, and YA4 at "L" level.

As a result, in the pixel element matrix 3, pixels on the second row are selected, and all of the pixels on the selected row output pixel data.

After that, the above-mentioned processing at the times t3 to t10 is executed, and pixel data of the pixel elements on the first column to the fourth column of the second row is sequentially output to the output terminal VOUT.

Further, the Y address for selecting the rows of the pixel elements on the third row and the fourth row is input from the data bus, and the pixel data of the pixel elements on the first column to the fourth column of the respective rows is sequentially output to the output terminal VOUT.

The invention claimed is:

1. An image sensor comprising a matrix of pixel elements for storing pixel data each addressable by an X-Y address scanning system, comprising:
    a register latch responsive to a pulse of write signal to turn off a Y address scanning enable signal no earlier than a leading edge of the write signal pulse and turn on the Y address scanning enable signal no earlier than a trailing edge of the write signal pulse, the register latch configured to read and hold Y address data substantially simultaneously with the leading edge of the write signal pulse; and
    a Y address register configured to disable itself from addressing the pixel elements while the Y address scanning enable signal from the register latch is turned off and decodes the Y address data held by the register latch.

2. The image sensor according to claim 1, wherein the resister latch turns off the Y address scanning enable signal substantially simultaneously with the leading edge of the write signal pulse, whereas turning on the Y address scanning enable signal subsequently to the training edge of the write signal pulse.

3. The image sensor according to claim 1, wherein the Y address register selects a row of pixel elements, using the decoded Y address data, when the Y address scanning enable signal is turned on.

4. The image sensor according to claim 3, further comprising an X address control unit configured to increment an X address signal to sequentially select the columns of pixel elements.

5. The image sensor according to claim 4, further comprising switches each functioning to gate outputs of a column of pixel elements, and the X address signal from the X address control unit, while being incremented, selectively activates the switches to sequentially enable outputs from the columns of pixel elements.

* * * * *